(12) United States Patent
Forghieri et al.

(10) Patent No.: US 9,313,954 B2
(45) Date of Patent: Apr. 19, 2016

(54) AGRICULTURAL SQUARE BALER

(71) Applicant: CNH Industrial America LLC, New Holland, PA (US)

(72) Inventors: Luigi Forghieri, Ghent (BE); Stefan De Rycke, Olsene-Zulte (BE); Xavier G. J. M. Bonte, Et Sint Kruis (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/407,642

(22) PCT Filed: Jun. 11, 2013

(86) PCT No.: PCT/EP2013/061960
§ 371 (c)(1),
(2) Date: Dec. 12, 2014

(87) PCT Pub. No.: WO2013/186188
PCT Pub. Date: Dec. 19, 2013

(65) Prior Publication Data
US 2015/0173300 A1   Jun. 25, 2015

(30) Foreign Application Priority Data

Jun. 12, 2012 (BE) .................................. 2012/0393

(51) Int. Cl.
*A01F 15/04* (2006.01)
*A01F 15/08* (2006.01)

(52) U.S. Cl.
CPC ................. *A01F 15/08* (2013.01); *A01F 15/04* (2013.01); *A01F 15/042* (2013.01); *A01F 15/0841* (2013.01)

(58) Field of Classification Search
CPC . A01F 15/042; A01F 15/0825; A01F 15/101; Y10T 74/2142; Y10T 403/553; Y10T 29/49288; F01B 1/062
USPC ........... 100/43, 50, 99, 179, 188 R, 189, 191, 100/192; 74/44
See application file for complete search history.

(56) References Cited

U.S. PATENT DOCUMENTS

| 1,411,367 | A |   | 4/1922  | Mottier |       |
|-----------|---|---|---------|---------|-------|
| 3,227,002 | A |   | 1/1966  | Gholson |       |
| 4,627,341 | A | * | 12/1986 | Sudbrack et al. | 100/41 |
| 7,007,599 | B2|   | 3/2006  | Roth    |       |

FOREIGN PATENT DOCUMENTS

EP    1518454 A2 *  3/2005  ............. A01F 15/04

* cited by examiner

*Primary Examiner* — Jimmy T Nguyen
(74) *Attorney, Agent, or Firm* — Patrick M. Sheldrake

(57) ABSTRACT

An agricultural square baler comprising a baling chamber, for compressing crop by a plunger, and a plunger drive connected to the plunger provided to drive the plunger. At least one connecting rod longitudinally delimited by a first and a second end is provided to transfer the rotational movement of the plunger drive into the linear reciprocal movement of the plunger. Each of the ends of the connecting rod having a first surface. An attachment connects a constraining element with the connecting rod at an attachment location away from the first surface of the connecting rod.

14 Claims, 10 Drawing Sheets

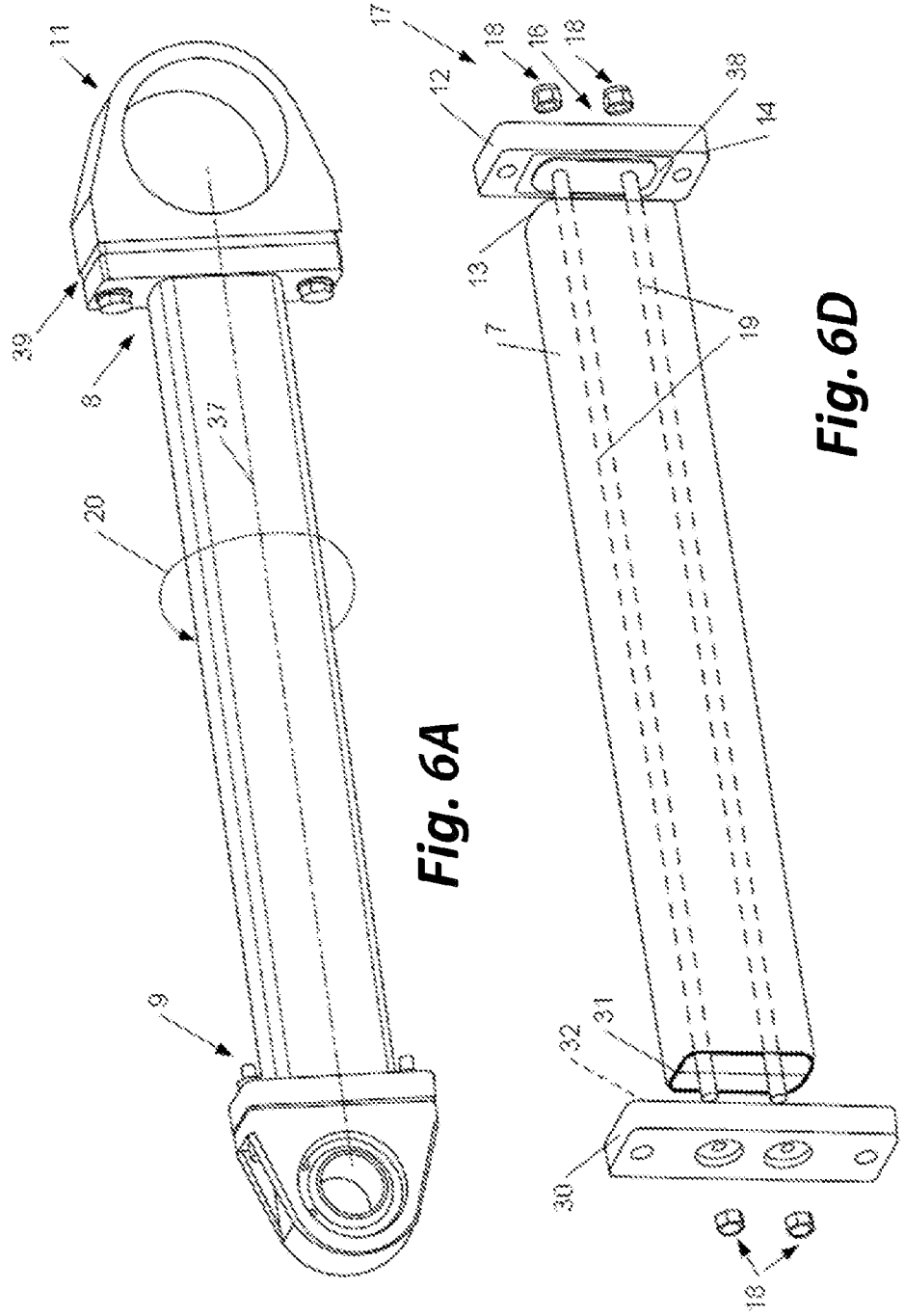

AGRICULTURAL SQUARE BALER

This application is the US National Stage filing of International Application Serial No. PCT/EP2013/061960 filed on Jun. 11, 2013 which claims priority to Belgian Application BE2012/0393 filed Jun. 12, 2012, each of which is incorporated herein by reference in its entirety.

FIELD OF THE INVENTION

The current invention relates to an agricultural square baler according to the preamble of the first claim.

The present invention also relates to the use of the agricultural square baler. Such square balers are already known to the person skilled in the art.

BACKGROUND OF THE INVENTION

EP1 516 527 for example describes such an agricultural square baler. The agricultural square baler comprises a parallelepipedal baling chamber. In the baling chamber a plunger is movably received along a longitudinal axis of the baling chamber. The agricultural square baler further comprises a feed inlet through which crop is conveyed into the baling chamber to be compressed there by the plunger into a bale. A plunger drive is connected to the plunger with a connecting rod transferring the rotational movement of the plunger drive into a linear reciprocal movement of the plunger. The connecting rod is longitudinally delimited by a first end and a second end opposing the first end. The plunger comprises a rotational joint element 64 rigidly attached to the first end of the connecting rod. On the other side of the connecting rod, the second end of the connecting rod is again rigidly attached to a second rotational joint element 60. This second joint element thereto comprises a U-shaped element at least partly constraining the connecting rod along a circumferential direction surrounding the longitudinal direction of the connecting rod at the second end of the connecting rod and rigidly attaching the joint element and the connecting rod to each other. A first surface of the connecting rod and a second surface of the joint element, more in particular the interior of the U-shaped element, abut each other. The joint element and the connecting rod are attached to each other by the U-shaped element and by an attachment, in particular a weld connection, at the first and the second surface as can be seen in FIG. 4 of EP1 516 527.

Another known way of connecting such a connecting rod with a joint element of the plunger is to weld the connecting rod to an intermediate element. This intermediate element is then connected to the joint element by e.g. two bolt connections.

However, such weld connections between the connecting rod and the joint element has been found to be prone to fatigue.

SUMMARY OF THE INVENTION

Therefore, it is an object of the current invention to provide an agricultural square baler with a reduced fatigue of the connecting rod.

This is achieved according to an agricultural baler according to the characterizing part of the first claim.

Thereto, an attachment connects the constraining element with the connecting rod at an attachment location away from the first surface of the connecting rod.

It was noticed that relatively large compression forces are working on the connecting rod during compacting of the material in the baling chamber by the plunger driven by the plunger drive through the connecting rod and that these large compression forces were transmitted through the weld between the connecting rod and the joint element of the connecting rod. It was further noticed that these large compression forces transmitted through the relatively small weld between the connecting rod and the joint element are very detrimental for the weld and was the cause of the relative poor fatigue resistance of the weld.

It was especially found that such weld connections will almost inevitably be partly situated between the two surfaces, i.e. the first surface of the connection rod and the second surface of the U-shaped element, such that the compression forces will further be transmitted through this part of the weld and thus an increasingly small area. Moreover, it was found that the parts of the weld which are inevitably situated between the two surfaces are especially prone to fatigue as a substantial part of the compression forces are transmitted through them.

Coming to that insight, it was realized that an improved connection between the connecting rod and the joint element could be realized by an intermediate constraining element which rigidly attaches the joint element and the connecting rod to each other by an attachment between the constraining element and the connecting rod at an attachment location away from the first surface of the connecting rod. Such an attachment at an attachment location away from the first surface, will indeed allow that the compression forces will be transmitted directly through the direct contact between the first surface and a second surface away from the attachment location, such that the risk that welds interfere with the transmittal of the compression force is significantly reduced and wherein the first surface of the connecting rod and the second surface are abutting at a location away from the attachment location between the connecting rod and the constraining element.

According to preferred embodiments of the current invention, the constraining element is connected to the joint element by clamping means.

According to preferred embodiments of the current invention, the joint element comprises the second surface. The first surface of the connecting rod and the second surface of the joint element are abutting at a location away from the attachment location between the connecting rod and the constraining element.

It has been found that when the attachment location is away from the first and the second surface, the compression forces are largely transmitted through the direct contact of the first and the second surface and that the expansion forces, which are relatively small in comparison to the compression forces, following the compression forces when retracting the plunger out of the baling chamber can be transmitted through other connections, such as the attachments attaching the joint element, the connecting rod and the constraining element to each other.

According to further preferred embodiments, the constraining element protrudes from the second surface and at least partly surrounds the connecting rod along a circumferential direction surrounding the longitudinal direction of the connecting rod.

According to another embodiment, the constraining element comprises the second surface. Although such configuration allows the connecting rod and the constraining element to be firmly interconnected, such configuration is however not critical for the invention and according to an alternative second configuration, the constraining element may also protrude from the second surface and at least partly surround the connecting rod along a circumferential direction surrounding the longitudinal direction of the connecting rod, such configuration preventing the connecting rod from rotating along its longitudinal axis.

According to more preferred embodiments of the current invention, the constraining element is clamped to the connecting rod by rod clamping means. It has been found that such mounting of the connecting rod to the constraining element allows a strong interconnection between the connecting rod and the constraining element while making a direct contact between the first and the second surface possible and avoiding having to interfere with the first and the second surface.

According to preferred embodiments of the current invention, the rod clamping means comprise a bolted joint with at least one bolt extending through the constraining element along length direction of the connecting rod. It has been found that such clamping means can be easily provided while nevertheless allowing a proper attachment of the constraining element and the connecting rod as, for example, nuts and bolts are widely available.

According to more preferred embodiments of the current invention, the constraining element attaches the joint element and the connecting rod to each other by a weld at the attachment location. As the constraining element protrudes from the second surface, it has been found that a weld can be provided at an attachment location away from the first and the second surface, for example at a seam between the constraining element and the connecting rod, where care is taken that no weld is applied at the first surface. Preferably, the weld is applied at a seam between the constraining element and the connecting rod, where the seam faces the second end of the connecting rod, to further reduce the risk that the weld interferes with the first or the second surface.

According to preferred embodiments, the constraining element attaches the joint element and the connecting rod to each other by a pin at the attachment location.

According to preferred embodiments of the current invention, the constraining element comprises at least a first and a second constraining part, abutting along opposing sides of the connecting rod substantially in the plane of movement of the plunger. It has been found that such parts can be relatively easy provided.

According to preferred embodiments of the current invention, the constraining element comprises a connecting rod surrounding element comprising an opening through which the connecting rod extends with the first end. Such a connecting rod surrounding elements has been found to further improve the constraining of the connecting rod such as to reduce the wear of the connecting rod during compression as a more precise positioning of the connecting rod is obtained.

According to preferred embodiments of the current invention, the constraining parts of the constraining element are in the form of distinct parts separately attached to the joint element. It has been found that such parts are easy to apply and construct.

According to preferred embodiments of the current invention, the constraining element is clamped to a remaining part of the joint element by constraining element clamping means, preferably comprising a bolted joint. The clamping means for example extend through at least part of or even fully through the constraining element and the remainder of the joint element. The clamping means in the form of the bolted joint for example comprise a bolt extending through at least part of the constraining element and the joint element and a nut clamping the joint element and the constraining element. It has been found that such clamping means are sufficient for withstanding the compression and expansion forces working on the connecting rod.

According to preferred embodiments of the current invention, an abutment plate is placed between the constraining element and the joint element and whereby the abutment plate comprises the second surface, and where the first surface of the connecting rod and the second surface of the abutment plate are abutting at a location away from the attachment location between the connecting rod and the constraining element. It has been found that such an abutment plate can be made specifically in light of receiving the first surface on it, especially under high compression forces. The abutment plate can for example be made from materials which can absorb such high compression forces whereas the remainder of the joint element can be made specific for the joint purposes without having to keep the contact with the first surface in mind. Moreover, when the abutment plate wears due to the high compression forces, it can be easily replaced without having to replace the entire joint element.

According to preferred embodiments of the current invention, the clamping means extend at least partly through the abutment plate if present. This way the clamping means keep the abutment plate into its desired position.

According to preferred embodiments of the current invention, a second joint element of the plunger drive is rigidly attached to the second end of the connecting rod through a second constraining element of the plunger drive with a first surface of the second end of the connecting rod and a second surface of the second joint element abutting each other. Also, the second constraining element rigidly attaches the second joint element and the connecting rod to each other by a second attachment between the second constraining element and the connecting rod at a second attachment location away from the first and the second surface of the respective second end of the connecting rod and the second joint element. This way both sides of the connecting rod are properly attached to the plunger and the plunger drive while being able to withstand the relatively large compression forces.

According to preferred embodiments of the current invention, the plunger is connected to the plunger drive with at least two transversely spaced connecting rods.

According to preferred embodiments of the current invention, the at least one connecting rod is oriented at least substantially parallel to the longitudinal axis of the baling chamber at least when the plunger is extended at least substantially completely into an end region of the baling chamber opposing the feed inlet along the longitudinal axis of the baling chamber.

BRIEF DESCRIPTION OF THE DRAWINGS

The invention will be further elucidated by means of the following description and the appended figures.

FIG. 5b shows an exploded view of a detail of FIG. 5a.

FIG. 5c shows an exploded view of a different embodiment of a detail of FIG. 5a.

FIG. 6a shows a further different embodiment of the connecting rod shown in FIG. 3.

FIGS. 6b and 6c show a sectional view of details of FIG. 6a.

FIG. 6d shows an exploded view of a detail of FIG. 6a.

DETAILED DESCRIPTION OF PREFERRED EMBODIMENTS

Figure 1:
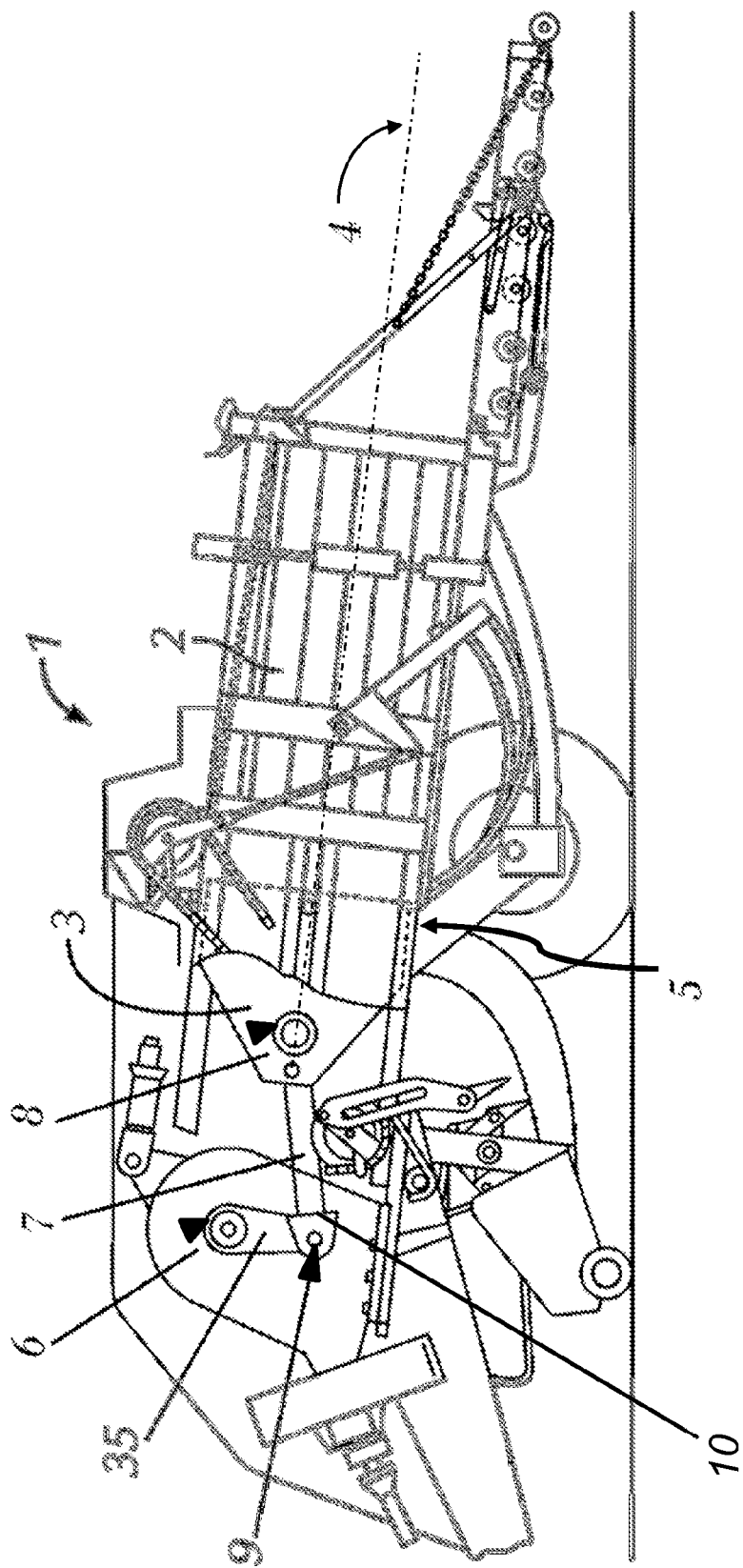
FIG. 1 shows an agricultural square baler according to the present invention with the connecting rod according to the present invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

FIG. 1 shows an embodiment of an agricultural square baler 1 according to the current invention.

The agricultural square baler 1 comprises a baling chamber 2, a plunger 3 movably received in the baling chamber 2 along the longitudinal axis 4 of the baling chamber, a feed inlet 5 to the baling chamber 2, through which crop can be conveyed into the baling chamber 2 to be compressed there by the plunger 3, a plunger drive 6 connected to the plunger 3 provided to drive the plunger 3 into a linear reciprocal movement by a rotational movement. Such basic configuration of a agricultural square baler 1 is already well known from the prior art as for example described in EP1 516 527.

FIG. 1 also shows that the plunger 3 is connected to the plunger drive 6 with at least two transversely spaced connecting rods: a first connecting rod 7 and a second connecting rod 35. Such a configuration is however not critical for the invention and also a single connecting rod 7 or even more than two connecting rods can be provided to the agricultural square baler 1 according to the invention.

Preferably, the at least one connecting rod 7 is oriented at least substantially parallel to the longitudinal axis 4 of the baling chamber 2 at least when the plunger 3 is extended at least substantially completely into the baling chamber 2. The connecting rod 7 is longitudinally delimited by a first end 8 and a second end 9 opposing the first end 8 provided to transfer the rotational movement of the plunger drive 6 into the linear reciprocal movement of the plunger 3. A crank 10 of the plunger drive 6 thereto is rotationally attached to the second end 9 of the connecting rod 7 and a joint element 11 of the plunger 3 is rigidly attached to the first end 8 of the connecting rod 7 through a constraining element 12.

Figure 2:
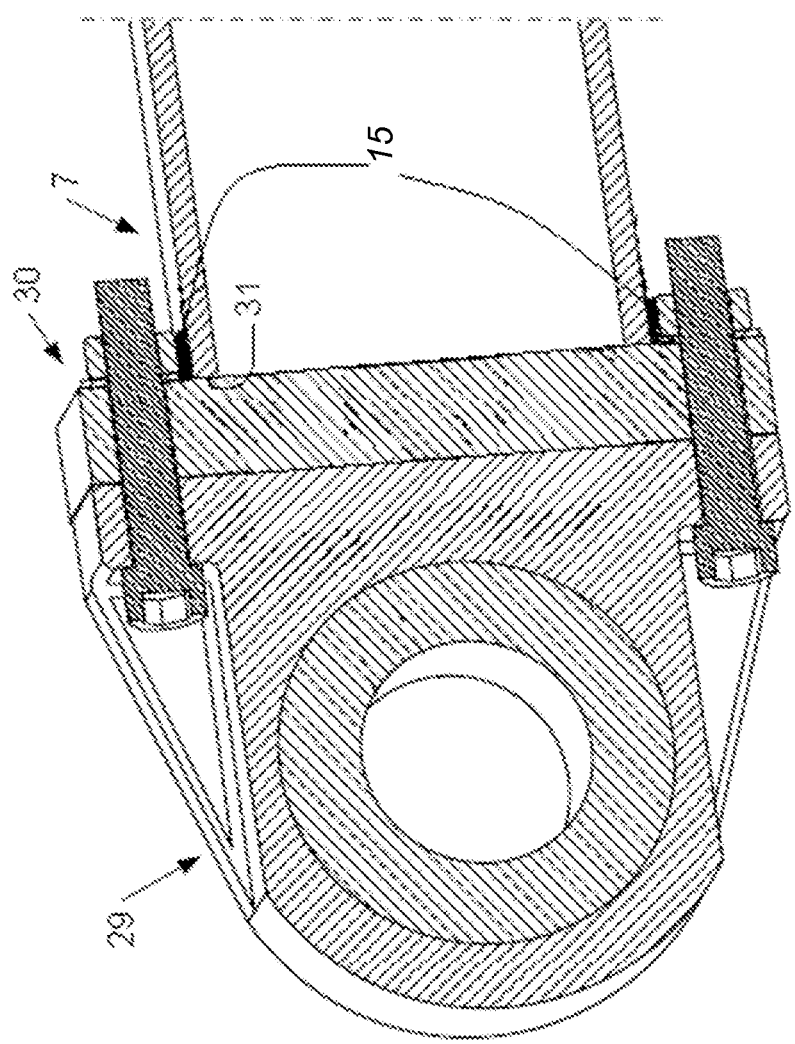
FIG. 2 shows a detail of the connecting rod as known in the prior art.

FIG. 2 shows a detail of a connecting rod as known in the prior art. Here, the first surface 31 of the connecting rod 7 is in direct contact with an intermediate element 30. The connecting rod 7 is connected to this intermediate element 30 by means of a weld 15. A hole is foreseen, going through the intermediate element 30 and the joint element 29, such that a bolted joint can be installed to connect the connecting rod 7 with the joint element 29. When the plunger 3 is being pushed inside the baling chamber 2, the compression forces will be transferred from the plunger drive 6 to the plunger 3 via the bolted joint and the weld 15. When the plunger is being pulled out of the baling chamber 2, the expansion forces will again be passing through the bolted joint and the weld 15. The compression forces are significantly high and constantly passing through the weld 15. Due to this alternating change of the forces, the weld 15 will not be able to withstand these forces, such that the weld is highly prone to fatigue with a reduced lifetime of the plunger drive 6 as a result.

Figure 3:
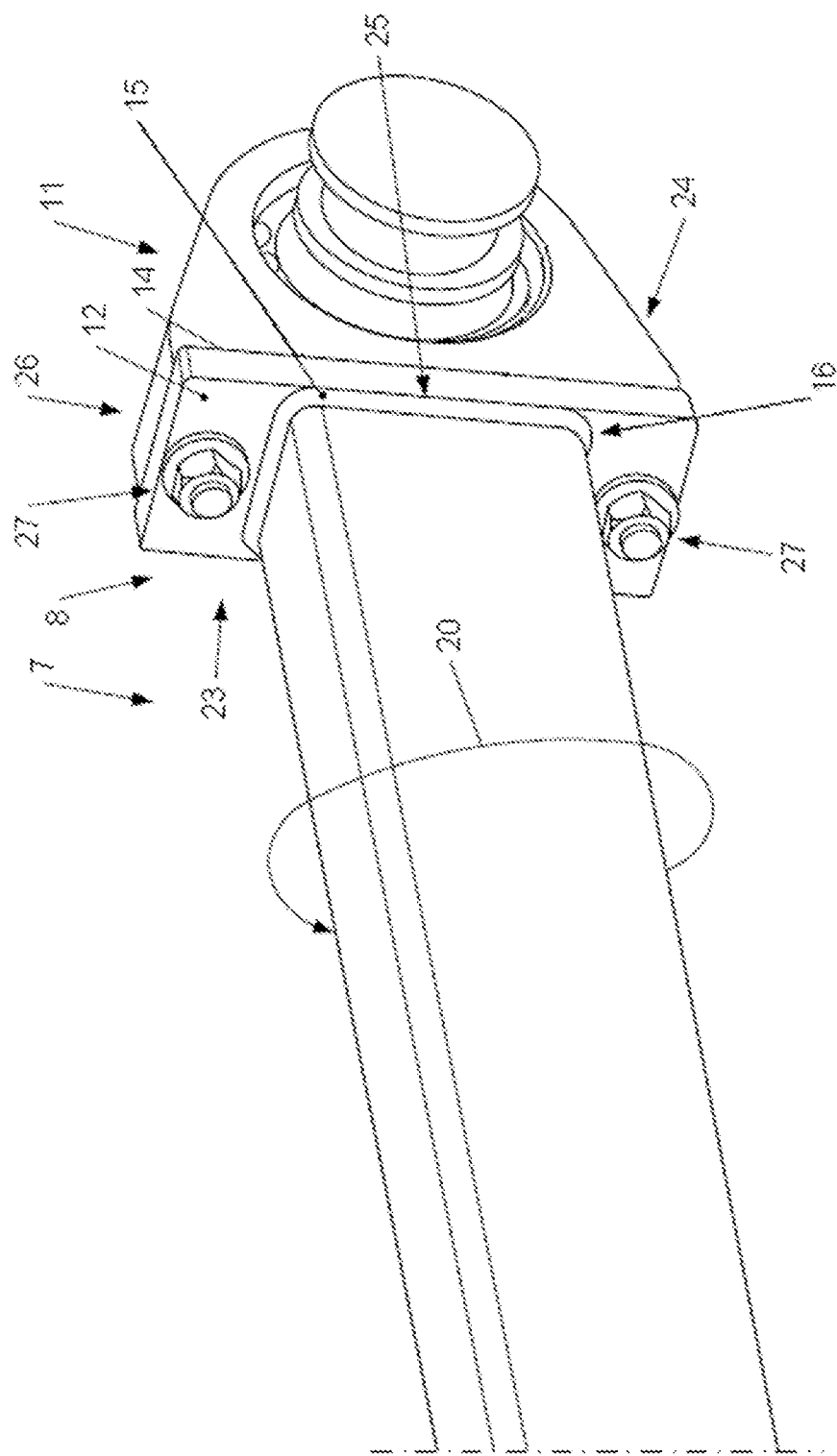
FIG. 3 shows a detail of the connecting rod as used in the agricultural square baler of FIG. 1.

FIG. 3 shows a detail of a first embodiment of the connecting rod 7 of FIG. 1, more in particular of the first end 8 of the connecting rod 7. An opening 25 is foreseen through the constraining element 12, allowing the first end 8 of the connecting rod 7 to pass through this opening 25 such that the constraining element 12 is completely surrounding the connecting rod 7 along a circumferential direction 20 of the longitudinal direction of the connecting rod 7. Now, this first end 8 of the connecting rod 7 can be placed through the opening 25 such that a first surface 13 of the connecting rod 7 can come into contact with a second surface 14 of the joint element 11 and are abutting each other. An attachment 15, e.g. a weld is rigidly attaching the constraining element 12 with the connecting rod 7 at an attachment location 16 away from the abutting first and second surfaces 13, 14. This weld 15 is located away from the first and the second surface 13, 14 as it is situated at a distance from the first surface 13. This way, indeed, presence of weld material in between the first and the second surface 13, 14 is prevented.

As further shown in FIG. 3, constraining element clamping means 26 are foreseen to rigidly connect the constraining element 12 to the joint element 11. The clamping means 26 can be formed as a first bolted joint 27, installed above the connecting rod 7 and connecting the constraining element 12 at its top side with the joint element 11 at a first constraining part 23, and a second bolted joint 27, installed below the connecting rod 7 and connecting the constraining element 12 at its bottom side with the joint element 11 at a second constraining part 24.

Now, when the plunger 3 is being pushed inside the baling chamber 2, the compression forces will be transferred via the abutting first and second surfaces 13, 14 from the plunger drive 6 to the plunger 3. Little or no compression forces will be passing through the attachment 15, being the weld, or the clamping means 26, being the bolted joints 27. When the plunger is being pulled out of the baling chamber 2, the expansion forces will be passing through the attachment 15 and the clamping means 26. Since the expansion forces are significantly lower than the compression forces, the attachment 15 and clamping means 26 will be able to withstand these forces. Also, since little or no compression forces will be passing through the attachment 15 and clamping means 26, these elements are less prone to fatigue and an increased lifetime of the plunger drive 6 can be achieved.

A similar construction (not shown) where the second end 9 of the connecting rod 7 is passing through an opening 25 of a second constraining element 30 can be installed. Likewise, an attachment 15 between the second constraining element 12 and the connecting rod 7 can be in the form of a weld 15, and clamping means 26 can be used to connect the constraining element 12 with the second joint element 29.

Figure 4:
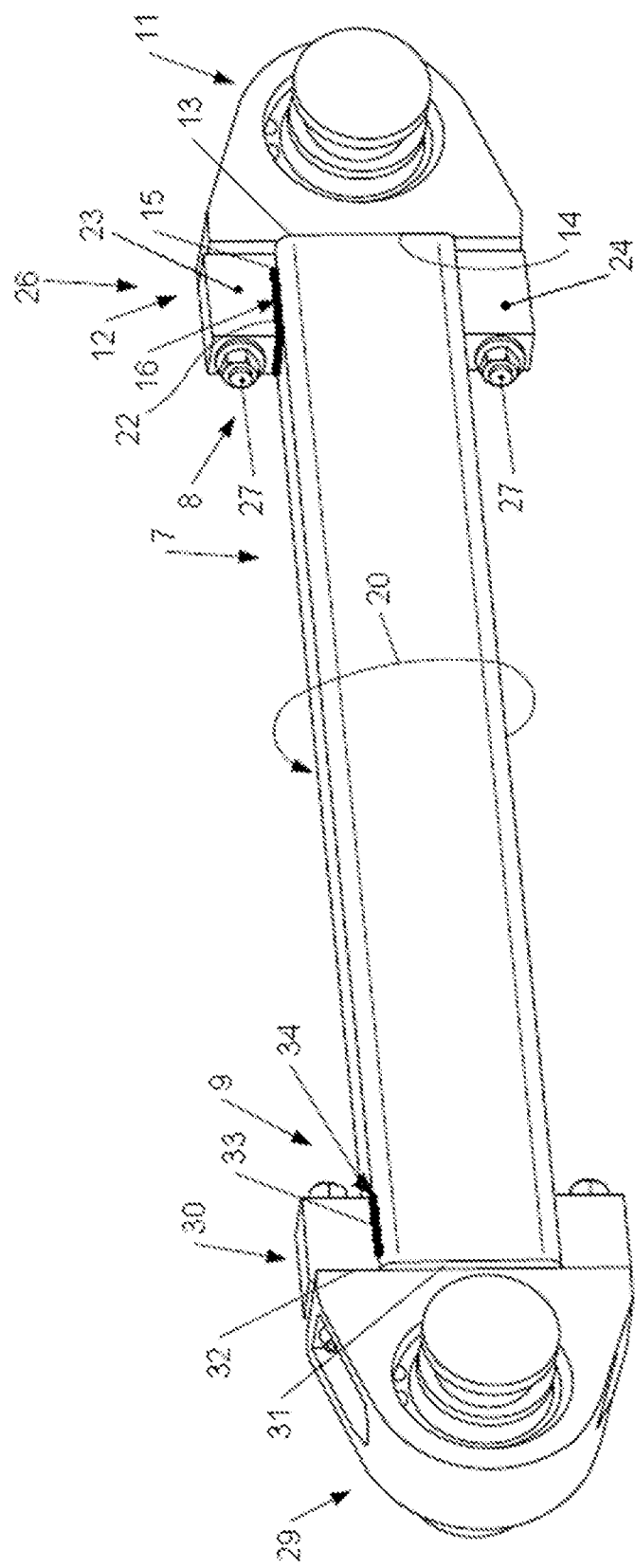
FIG. 4 shows a detail of a different embodiment of the connecting rod shown in FIG. 2.

Although in FIG. 3 the clamping means 26 is formed as a single element, FIG. 4 shows a different embodiment of the connecting rod 7 and the joint element 11 of a square baler 1 according to the invention. FIG. 4 for example differs from FIG. 3 in that the constraining element 12 is now formed as two distinct parts 23, 24, and as such are only partly surrounding the connecting rod 7.

The attachment or weld 15 between the first constraining part 23 and the connecting rod 7 and between the second constraining part 24 and the connecting rod 7 is now applied at a seam 22. This weld 15 can be placed where the seam 22 faces the second end 9 of the connecting rod 7, so on the side of the first and second constraining part facing the second end of the connecting rod 7; but also on the seam 22 between the sides of the first and second constraining part 23,24 and the connecting rod. However, care should be taken not to apply a weld between the first surface 13 of the connecting rod and the second surface 14 of the joint element 11, since this would result in a similar connection as the connection of the prior art as shown in FIG. 3.

The first 23 and second 24 constraining parts are in their turn connected to the joint element 11 by clamping means 26. In FIG. 4, the clamping means are again constructed as a bolted joint 27, where a bolt can pass through a hole in the first 23 and second 24 constraining part. In the joint element 11, spacing is foreseen to receive the head of the bolt and the corresponding nut can be placed on the bolt at the first 23 and second 24 constraining parts to secure the bolt. This is however not critical for the invention and the constraining element 12 can also be attached to a remaining part of the joint element 11 by for example welding.

In the embodiment shown in FIG. 4, a second joint element 29 of the plunger drive 6 rigidly attached to the second end 9 of the connecting rod 7 is shown. The connecting rod 7 is attached to the plunger drive 6, more in particular the crank 10, through a second constraining element 30 of the plunger drive 6. The first and the second joint element are attached to the connecting rod 7 similarly. A first surface 31 of the second end 9 of the connecting rod 7 and a second surface 32 of the second joint element 29 abut each other. The second constraining element 30 rigidly attaches the second joint element 29 and the connecting rod 7 to each other by a second attachment 33 between the second constraining element 30 and the connecting rod 7 at a second attachment location 34 away from the first 31 and the second surface 32 of the respective second end 9 of the connecting rod 7 and the second joint element 29.

Figure 5A:
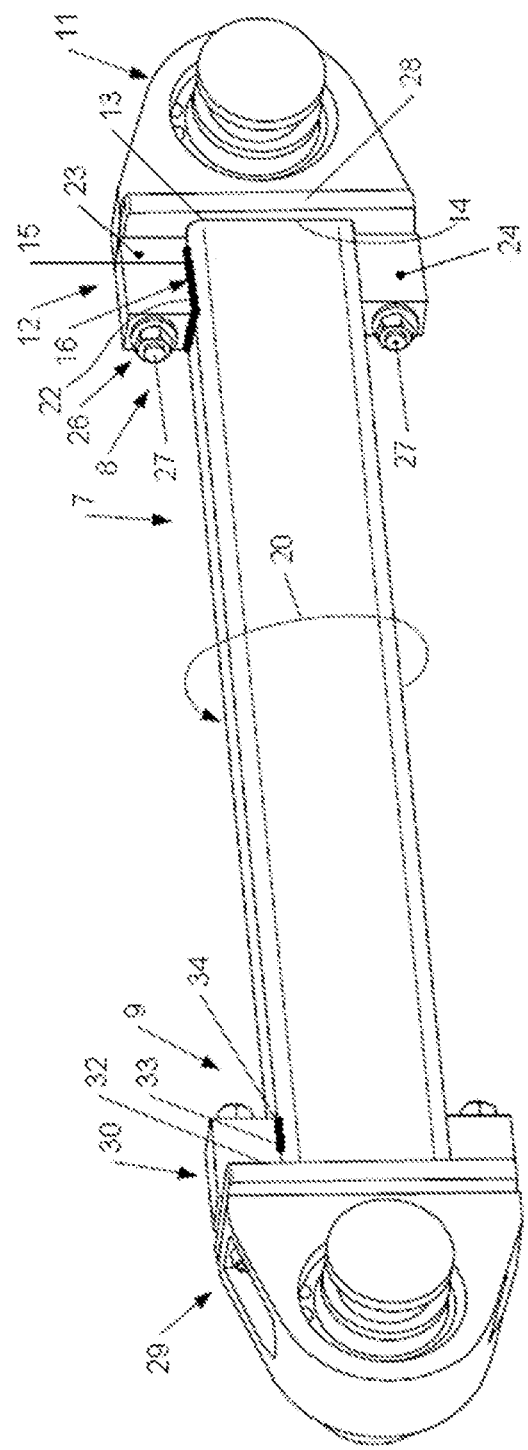
FIG. 5a shows a detail of yet another different embodiment of the connecting rod shown in FIG. 2.

FIG. 5a shows a detail of a different embodiment of the connecting rod shown in FIG. 3, wherein the joint element 11 comprises an abutment plate 28 comprising the second surface 14 of the joint element 11. However, such an abutment plate 28 is not critical for the invention, as shown in the previous embodiments, but could have some advantages, since the plate 28 can protect the surface of the joint element 11. The joint element 11 can be constructed as a casting element, and the continuously moving back and forward of the plunger, and thus the pushing of the surface 13 of the connecting rod 7 against the surface 14 of the joint element 11 can damage the surface of the joint element 11. By placing the abutment plate 28 between the joint element 11 and the connecting rod 7, this damage can be avoided. The contact surface of the abutment plate 28 is bigger than the contact surface 13 of the connecting rod 7, and will provide for a more even distribution of the compression forces.

As is the case in the embodiment of FIG. 4, an attachment, e.g. a weld 15, needs to be foreseen in the seam 22 between the first 23 and second 24 constraining part, such that these parts are connected with the connecting rod 7. Likewise, a bolted joint 27 is foreseen on each first 23 and second 24 constraining part to connect these parts with the joint element 11.

Figure 5B:
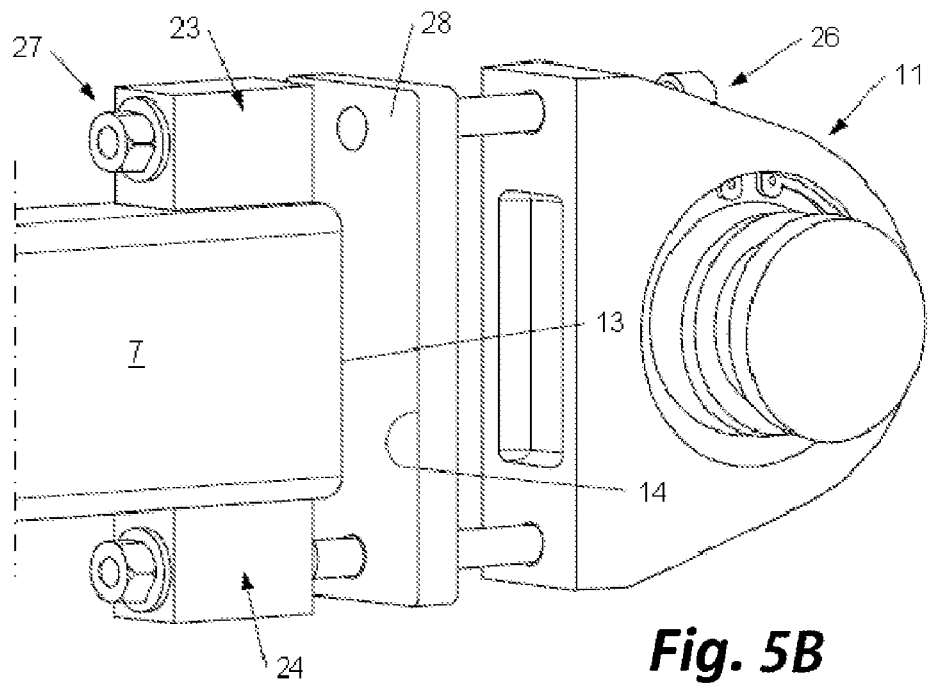

FIG. 5b shows an exploded view of the embodiment of FIG. 5a. It is clearly shown that the abutment plate 28 is placed between the constraining element 12 and the joint element 11. Holes are foreseen through joint element 11, abutment plate 28 and the first 23 and second 24 constraining part of constraining element 12 for receiving the bolt.

Figure 5C:
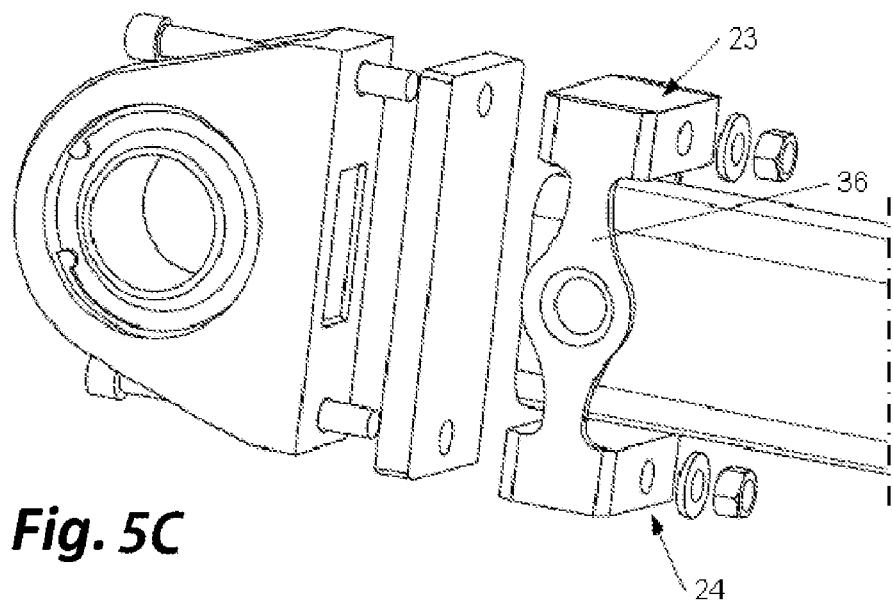

FIG. 5c shows an exploded view of a different embodiment of a detail of FIG. 5a. In this embodiment, the first and the second constraining part 23, 24 are further interconnected by a first and second constraining part connecting element 36. The connecting element 36 is welded to the first and the second part 23, 24 but can also be bolted, etc. to the first and the second part 23, 24. Moreover such a first and second constraining part connecting element 36 can in addition be directly connected to the connecting rod 7, for example by welding, bolting, etc. . . . It has been found that such a first and second constraining part 23, 24 interconnecting element 36 allows to further restrict movement of the connecting rod 7 with respect to the joint element and therefore further improves the interconnection between them, especially when the first and second constraining part connecting element 36 in addition is directly connected to the connecting rod 7. Although not shown, the abutment plate 28 of FIG. 5 can also be used in combination with the constraining element 12 of FIG. 1. In this case, the abutment plate 28 will be placed between the constraining element 12 and the joint element 11, so as to protect the surface 14 of the joint element 11.

Figure 6B:
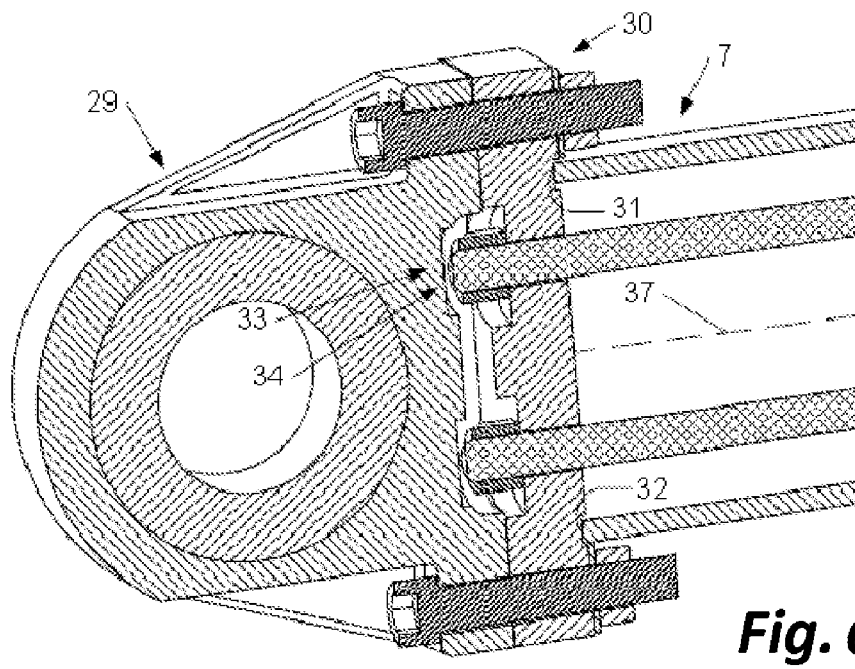
Figure 6C:
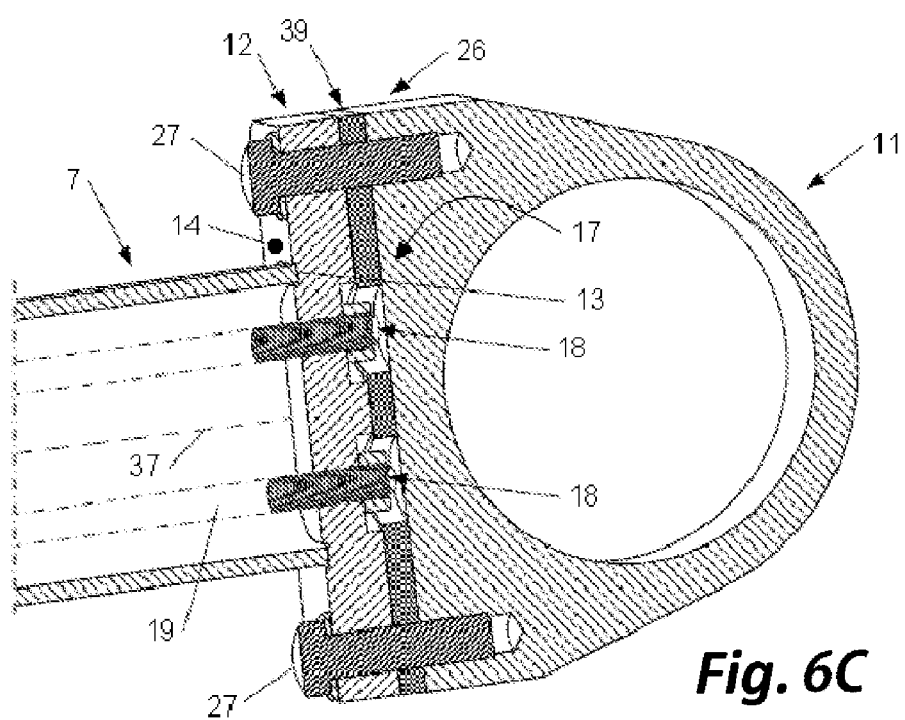

FIG. 6a shows a different embodiment of the connecting rod shown in FIG. 3, where no welding is needed to connect the connecting rod 7 with the constraining element 12. FIGS. 6b and 6c show a sectional view of details of FIG. 6a. FIG. 6d shows an exploded view of a detail of FIG. 6a.

In this embodiment, the constraining element 12 comprises the second surface 14, so that no direct contact is needed between the first surfaces 13 or 31 of the connecting rod 7 and the joint elements 11, 29.

Preferably, the constraining elements 12 and 30 are clamped to the connecting rod 7 by rod clamping means 17. The rod clamping means 17 are shown in FIGS. 6b and 6c and especially in FIG. 6d. Preferably, as shown in FIGS. 6b-6d, the rod clamping means 17 comprises two bolted joints with at least one bolt 19 extending through the constraining element 12 along length direction 37 of the connecting rod 7. At each end of the bolt 19, a nut 18 is foreseen. As such, the connecting rod 7 is held between the two constraining elements 12 and 30. Although FIGS. 6b-6d shows that the bolted joint 18,19 comprises two bolts extending along length direction 37 of the connecting rod 7, this is not critical for the invention and the bolted joint 18 can also comprise less or more bolts 19 extending along longitudinal direction of the connecting rod 7. Although FIGS. 6a-6d show that the at least one bolt 19 of the bolted joint 18,19 extends through the connecting rod 7, protecting it from for example dirt or impacts, this is not critical for the invention and the bolt 19 can also extend outside of the connecting rod 7, although not shown in the figures. FIG. 6d shows that the first surface of the connecting rod 7 is received in a groove 38 thereto provided in the constraining element 12 for an improved positioning of the connecting rod 7 with respect to the constraining element 12. Such a groove 38 is however not critical for the invention and can be omitted, although not shown in the FIGS. 6a-6d.

The embodiments shown in FIGS. 6a and 6c show that an intermediate abutment plate 39 can be used. When using such an intermediate plate 39, the use of recesses in the constraining elements 12, 30 and/or in the joint elements 11, 29 can be superfluous. If no intermediate plate 39 is used, then recesses need to be foreseen in the constraining elements 12,30 and/or joint elements 11, 29 such that the nuts 18 and the end of the bolt 19 are enclosed by the different elements. This embodiment is shown in FIG. 6b.

Figure 7:
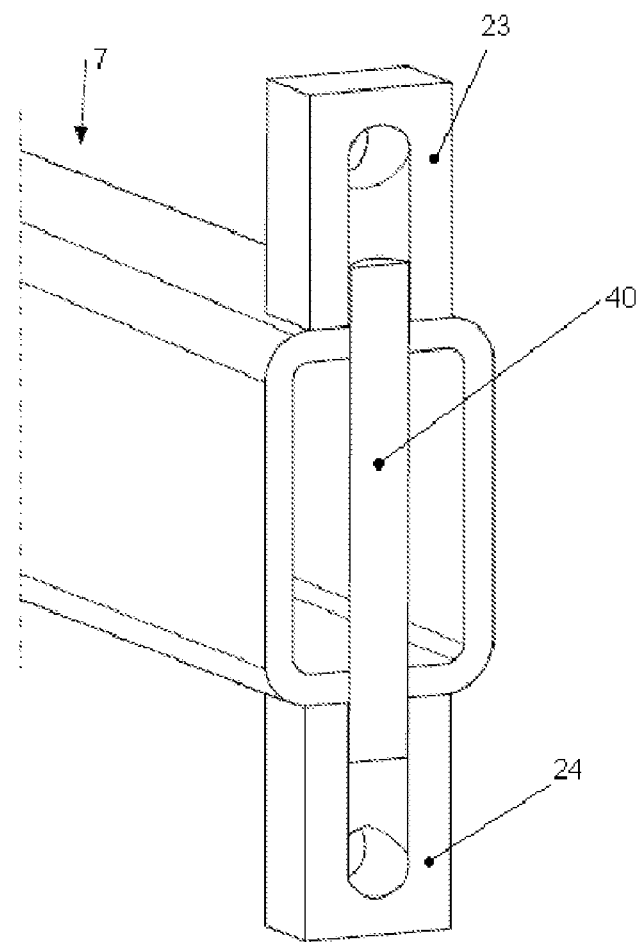
FIG. 7 shows a detail of yet another different embodiment of the connecting rod shown in FIG. 3.

FIG. 7 shows a detail of a different embodiment of the connecting rod shown in FIG. 3. It is not critical for the invention that the constraining element 12 is welded to the connecting rod 7. There however needs to be a direct connection between the connecting rod 7 and the constraining element 12. Another possibility then the welding of the two elements together, is for instance connecting the connecting rod 7 to the constraining element 12 by a joint 40 extending through the constraining element 12 and the connecting rod 7 along a direction crossing the longitudinal direction of the connecting rod 7. Therefore, a through hole is foreseen through the connecting rod 7 at a distance away from the location where the first surface 13 of the connecting rod 7 is abutting the second surface 14 of the joint element 7. This distance is comparable with the distance between the abutting location of the surfaces 13,14 and the attachment location 16 of FIG. 2. A joint, e.g. a pin 40, is placed in the through hole of the joint element 7. The first constraining part 23 is placed on one side of the pin, while the second constraining part 24 is placed on the other side of the pin 40. When installing the bolted joints 27 through the first 23 and second 24 constraining parts, the connecting rod 7 will be connected to the joint element 11 without the use of welding. In this case, when the plunger 3 is being pushed inside the baling chamber 2, the compression forces will again be transferred via the abutting first and second surfaces 13,14 from the plunger drive 6 to the plunger 3. Little or no compression forces will be passing through the pin 40, or the clamping means 26, being the bolted joints 27. However, when the plunger is being pulled out of the baling chamber 2, the expansion forces will be passing through the pin 40 and the clamping means 26. An increased lifetime of the different components is herewith realized.

Figure 8:
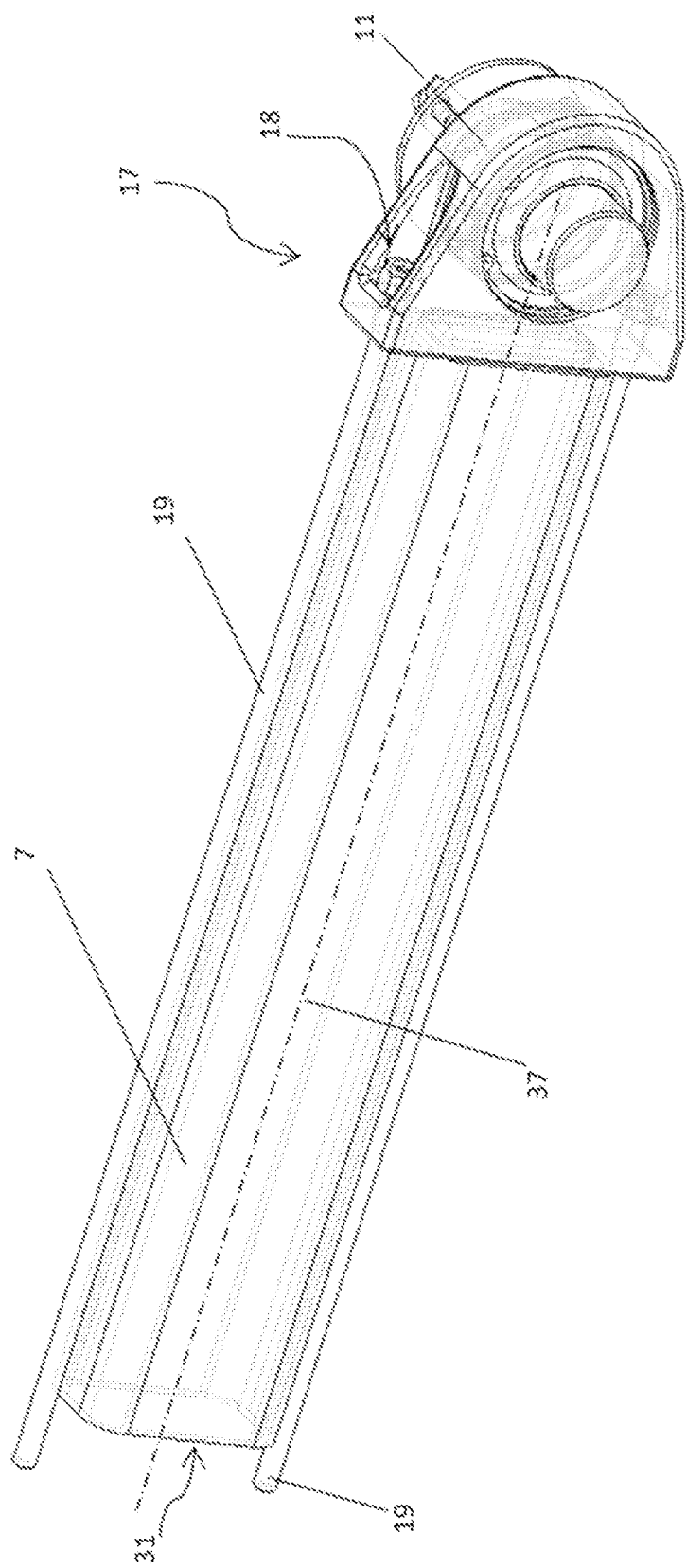
FIG. 8 shows a further different embodiment of the connecting rod shown in FIG. 3.

FIG. 8 shows yet another different embodiment of the connecting rod shown in FIG. 3, where again no welding is needed to connect the connecting rod 7 with the constraining element. In this embodiment, the constraining element and the joint elements 11, 29 (only one joint element 11 shown in FIG. 8) are the same elements, such that direct contact can be made between the first surfaces 13, 31 of the connecting rod 7 and the joint elements 11, 29.

Preferably, the joint elements 11 and 29 are clamped to the connecting rod 7 by rod clamping means 17. Preferably, the rod clamping means 17 comprises two bolted joints with two bolts 19 extending on the outside and along length direction 37 of the connecting rod 7. At each end of the bolt 19, a nut 18 is foreseen. However, the use of a nut on each end is not necessary, since one nut can be replaced by using a threaded connection. That way, the bolt 19 is directly screwed into the threaded hole which is foreseen in one of the two joint elements 11 or 29, while the hole of the other joint element 29 or 11 will remain without screw-thread. As such, the connecting rod 7 is held between the two joint elements 11 and 29. Although FIG. 8 shows that the bolted joint comprises two bolts extending along length direction 37 of the connecting rod 7, this is not critical for the invention and the bolted joint can also comprise even additional bolts 19 extending along the longitudinal direction of the connecting rod 7. In this case, additional connection means need to be foreseen on the joint elements 11 and 29, allowing the fixing of the additional bolts 19 to the joint elements 11 and 29.

Although not shown, the first surface of the connecting rod 7 is received in a groove thereto provided in the joint element 11 and/or 29 for an improved positioning of the connecting rod 7 with respect to the joint element 11, 29. Such a groove is however not critical for the invention and can be omitted, or replaced by a bulge or an increase of the contact surface of the joint element 11 and/or 29. This bulge is preferably designed such that the connecting rod can be positioned with respect to the joint element, providing for a more easy way of installation of the clamping means 17.

The invention claimed is:

1. An agricultural square baler comprising:
    a baling chamber,
    a plunger movably received in the baling chamber along the longitudinal axis of the baling chamber,
    a feed inlet associated with the baling chamber—to convey crop therethrough for a compression by the plunger,
    a plunger drive connected to the plunger to drive the plunger from a rotational movement into a linear reciprocal movement, the plunger drive being connected to the plunger by at least one joint element,
    at least one connecting rod longitudinally delimited by a first end and a second end opposing the first end to transfer the rotational movement of the plunger driven into the linear reciprocal movement of the plunger, each of the ends of the connecting rod having a first surface, and
    a constraining element for rigidly attaching one end of the connecting rod with the joint element,
    wherein the constraining element and the connecting rod are affixed together by an attachment at an attachment location that is offset from the first surface of the connecting rod.

2. The agricultural square baler of claim 1, wherein the constraining element is connected to the joint element by clamping arrangement.

3. The agricultural square baler of claim 1, wherein the constraining element comprises at least a first and a second constraining part, abutting and directly affixed to the opposing sides of the connecting rod substantially in the plane of movement of the plunger.

4. The agricultural square baler of claim 1, wherein the joint element comprises a second surface, and where the first surface of the connecting rod and the second surface of the joint element are abutting at a location longitudinally displaced from the attachment location between the connecting rod and the constraining element.

5. The agricultural square baler of claim 4, wherein the constraining element protrudes from the second surface and at least partly surrounds the connecting rod along a circumferential direction surrounding the longitudinal direction of the connecting rod.

6. An agricultural square baler comprising:
    a baling chamber;
    a plunger movably received in the baling chamber along the longitudinal axis of the baling chamber;
    a feed inlet associated with the baling chamber—to convey crop therethrough for a compression by the plunger;
    a plunger drive connected to the plunger to drive the plunger from a rotational movement into a linear reciprocal movement, the plunger drive being connected to the plunger by at least one joint element;
    at least one connecting rod longitudinally delimited by a first end and a second end opposing the first end to transfer the rotational movement of the plunger driven into the linear reciprocal movement of the plunger, each of the ends of the connecting rod having a first surface; and
    a constraining element for rigidly attaching one end of the connecting rod with the joint element;

wherein an attachment connects the constraining element with the connecting rod at an attachment location away from the first surface of the connecting rod;

wherein an abutment plate is placed between the constraining element and the joint element, and whereby the abutment plate comprises a second surface, and where the first surface of the connecting rod and the second surface of the abutment plate are abutting at a location away from the attachment location between the connecting rod and the constraining element.

7. The agricultural square baler of claim 1, wherein the constraining element attaches the joint element and the connecting rod to each other by a weld at the attachment location.

8. An agricultural square baler comprising:
a baling chamber;
a plunger movably received in the baling chamber along the longitudinal axis of the baling chamber;
a feed inlet associated with the baling chamber—to convey crop therethrough for a compression by the plunger;
a plunger drive connected to the plunger to drive the Hunger from a rotational movement into a linear reciprocal movement, the plunger drive being connected to the plunger by at least one joint element;
at least one connecting rod longitudinally delimited by a first end and a second end opposing the first end to transfer the rotational movement of the plunger driven into the linear reciprocal movement of the plunger, each of the ends of the connecting rod having a first surface; and
a constraining element for rigidly attaching one end of the connecting rod with the joint element;
wherein an attachment connects the constraining element with the connecting rod at an attachment location away from the first surface of the connecting rod;

wherein the constraining element attaches the joint element and the connecting rod to each other by a weld at the attachment location;

wherein the weld is applied at a seam between the constraining element and the connecting rod, where the seam faces the second end of the connecting rod.

9. The agricultural square baler of claim 1, wherein the constraining element attaches the joint element and the connecting rod to each other by a pin at the attachment location.

10. The agricultural square baler of claim 1, wherein the constraining element comprises a second surface, and where the first surface of the connecting rod and the second surface of the constraining element are abutting at a location away from the attachment location between the connecting rod and the constraining element.

11. The agricultural square baler of claim 9, wherein the constraining element is clamped to the connecting rod by a rod clamping arrangement.

12. The agricultural square baler of claim 11, wherein the rod clamping arrangement comprises a bolted joint with at least one bolt extending through the constraining element along length direction of the connecting rod.

13. The agricultural square baler of claim 1, wherein the plunger is connected to the plunger drive with at least two transversely spaced connecting rods.

14. The agricultural square baler of claim 1, wherein the at least one connecting rod is oriented at least substantially parallel to the longitudinal axis of the baling chamber at least when the plunger is extended at least substantially completely into an end region of the baling chamber opposing the feed inlet along the longitudinal axis of the baling chamber.

* * * * *